Patented Sept. 7, 1926.

1,598,972

UNITED STATES PATENT OFFICE.

VICTOR E. KIMMEL, OF ROCHESTER, NEW YORK, ASSIGNOR TO EASTMAN KODAK COMPANY, OF ROCHESTER, NEW YORK, A CORPORATION OF NEW YORK.

PROCESS FOR REDUCING THE VISCOSITY CHARACTERISTICS OF NITROCELLULOSIC MATERIALS.

No Drawing. Application filed February 25, 1925. Serial No. 11,602.

This invention relates to processes for reducing the viscosity characteristics of nitrocellulosic materials. One object of the invention is to provide a safe, simple and inexpensive process for treating such materials in order to lower the viscosity characteristics. Another object of the invention is to provide a process which can be operated at atmospheric pressure and at room temperature without the trouble and expense of pressure vessels or heating operations. Other objects will hereinafter appear.

In the manufacture of nitrocellulose lacquers, such as those used for spraying, for example, it is desirable to modify the properties of nitrocellulose before it is made up into such lacquers. The ordinary nitrocelluloses have high viscosity characteristics when made up into the usual lacquer solutions. Their viscosity characteristics should, therefore, be lowered so that they can be made into highly concentrated yet easily flowable or sprayable solutions. Moreover, the ability to reduce the viscosity characteristics of nitrocellulose makes available for use in lacquers, large amounts of waste or scrap material, such as pyroxylin waste and photographic film scrap.

I have found that the viscosity characteristics of nitrocellulose may be reduced by acting thereon with a solution of one or more of the hypochlorites of alkali or alkaline earth metals. The process is preferably carried out at room temperature and atmospheric pressure although the action is speeded up if the bath is warm. In the preferred form of my invention I select calcium hypochlorite, Ca(ClO)$_2$ and employ a saturated solution of it. This is a relatively inexpensive material and it is easy to obtain a workable concentration by employing a saturated solution without danger of getting the bath too strong.

While I shall describe one form of my invention by way of illustration, it will be understood that the invention is not limited to the details of this example, except as indicated in the appended claims. The nitrocellulose, say in the form of pyroxylin waste or film scrap from which the gelatinous coatings have been removed, and also preferably in comminuted form, is immersed in a saturated aqueous solution of calcium hypochlorite at room temperature and atmospheric pressure.

The duration of the treatment is preferably determined by test. From time to time representative samples of the material are taken out of the bath, washed, dried, dissolved, and the viscosity of the solutions measured. The action may vary from one day to more than a week according to the desired amount of the reduction in viscosity characteristics, and according to the highness of the viscosity characteristics at the start of the treatment. The nitrocellulosic material may contain, along with the nitrocellulose in solid colloidized form, high-boiling compounds or softeners, such as camphor, butyl alcohol, etc. The presence of such compounds does not interfere with the process but, in fact, tends to facilitate it and reduce the time of operation.

Having thus described my invention, what I claim as new and desire to secure by Letters Patent is:

1. The process of treating nitrocellulosic material which comprises acting thereon with a bath of hypochlorite until the viscosity characteristics of the nitrocellulose are reduced thereby.

2. The process of treating colloidized nitrocellulose which comprises acting thereon with an aqueous solution of a hypochlorite of an alkaline earth metal until the viscosity characteristics of the nitrocellulose are reduced thereby.

3. The process of treating nitrocellulosic material which comprises acting thereon with an aqueous saturated solution of calcium hypochlorite until the viscosity characteristics of the nitrocellulose are lowered thereby.

4. The process of treating solid colloidized nitrocellulose associated with high-boiling organic compounds which comprises immersing such material, while in comminuted form, in an aqueous bath of hypochlorite until the viscosity characteristics of the nitrocellulose are reduced thereby.

5. The process of treating film scrap in comminuted form and substantially free from gelatinous coatings, which comprises immersing said scrap in a saturated aqueous solution of calcium hypochlorite at room temperature until the viscosity characteristics of the nitrocellulose in the scrap are reduced thereby.

Signed at Rochester, New York, this 11th day of February 1925.

VICTOR E. KIMMEL.